United States Patent
Ouchi et al.

(10) Patent No.: US 7,392,440 B2
(45) Date of Patent: Jun. 24, 2008

(54) OPTICAL RECEPTION DEVICE AND OPTICAL RECEPTION METHOD

(75) Inventors: Kazuhide Ouchi, Tokyo (JP); Kazuo Kubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/562,799

(22) PCT Filed: Feb. 27, 2004

(86) PCT No.: PCT/JP2004/002458

§ 371 (c)(1),
(2), (4) Date: Apr. 25, 2006

(87) PCT Pub. No.: WO2005/002127

PCT Pub. Date: Jan. 6, 2005

(65) Prior Publication Data

US 2006/0222376 A1 Oct. 5, 2006

(30) Foreign Application Priority Data

Jun. 30, 2003 (JP) ............................. 2003-186390

(51) Int. Cl.
*H03M 13/00* (2006.01)
(52) U.S. Cl. ........................................ 714/709; 714/752
(58) Field of Classification Search ................. 714/709, 714/752
See application file for complete search history.

(56) References Cited

U.S. PATENT DOCUMENTS 5,657,014 A * 8/1997 McLaughlin ................. 341/59
7,024,599 B2 * 4/2006 Castagnozzi et al. ......... 714/709
7,180,968 B2 * 2/2007 Miyauchi et al. ............ 375/341
7,239,673 B2 * 7/2007 Sawada et al. .............. 375/316

FOREIGN PATENT DOCUMENTS

| JP | 08-008989 | 1/1996 |
| JP | 2002-330104 | 11/2002 |
| JP | 2003-018023 | 1/2003 |
| JP | 2003-163637 | 6/2003 |

\* cited by examiner

*Primary Examiner*—Joseph D Torres
(74) *Attorney, Agent, or Firm*—Oblon, Spivak, McClelland, Maier & Neustadt, P.C.

(57) ABSTRACT

An optical signal receiving equipment including an optical-electrical converter configured to convert optical signals into electronic signals; first deciders configured to transform the electronic signals into first binary signals; a second decider configured to transform the electronic signals into a second binary signal; a decision encoder configured to compute identification signals based on the plurality of first binary signals, and to compute reliability information of the computed identification signals; a converter configured to combine the identification signals and the second binary signal to combined identification signals; and a controller configured to execute an initial identification of the electronic signals in any one of the plurality of first deciders by using an initial threshold level in the plurality of first deciders, to measure an average amplitude of the electronic signals, and to correct the threshold level of the plurality of first deciders based on a variation of the average amplitude of the electronic signals.

1 Claim, 13 Drawing Sheets

OPTICAL RECEPTION DEVICE AND OPTICAL RECEPTION METHOD

TECHNICAL FIELD

The present invention is related to optical signal receiving equipments having an error correction function.

BACKGROUND ART

In order to cope with communication traffic that tends to drastically increase in accordance with recent increasing demand for the Internet, a technological development aiming at high speed and large-volume transmission has been advancing. In a submarine cable system supporting international communications, etc., the transmission quality is deteriorated and bit errors are prone to be generated by such as wavelength dispersion due to transmitting a large-volume of data at a high speed for a long distance. Therefore, data is usually transmitted with high efficient error correction code "FEC" (forward error correction). Although, a hard decision error correction method, in which the identification of received data is executed by one decider, has been used as an error correction method for FEC, in recent years, a soft decision error correction method, in which the identification of received data is executed by a plurality of deciders by using a plurality of identification thresholds, has been under investigation in order to improve the error correction capability. (For example, refer to Japanese Laid-Open Open Patent Publications 2002-330104, Page 5 through 7, FIG. 1).

However, there have been problems in that the soft decision error correction capability of the optical signal receiving equipment differs in accordance with difference attributable to manufacturing (hereinafter referred to as manufacturing difference) in individual deciders or deterioration over time thereof, because the identification is executed by the plurality of deciders in conventional optical signal receiving equipment.

Moreover, there have been problems in that electric power consumption is increased in accordance with increasing the volume of circuits, because the identification is executed by the plurality of deciders.

Furthermore, there have been problems in that the error correction capability fluctuates in accordance with amplitude variations of input electronic signals during operations.

The present invention has been made in order to solve the above problems in the conventional optical signal receiving equipment.

DISCLOSURE OF THE INVENTION

An optical signal receiving equipment related to the present invention comprises a control means for processing hard decision identification with a plurality of devices, and correcting the thresholds in the plurality of deciders in a soft decision-identification means based on each of hard decision-identification results.

Thereby, fluctuations in error correction capabilities of the optical signal receiving equipment in accordance with manufacturing difference in individual deciders or deterioration over time of the decider can be suppressed.

Moreover, the optical signal receiving equipment further comprises a control means for selecting one or more deciders to be operated from the plurality of deciders in a soft decision-identification means based on identification results by the plurality of deciders.

Thereby, electric power consumption can be controlled in accordance with the quality of optical received signals.

Furthermore, the optical signal receiving equipment further comprises a control means for processing hard decision identification related to a plurality of identification levels by any of the plurality of deciders, measuring an average amplitude of the electronic signals based on the result of the hard decision identification, and correcting thresholds in the plurality of deciders in the soft decision-identification means based on the variation over time in the measured average amplitude.

Thereby, fluctuations in the error correction capabilities of the optical signal receiving equipment in accordance with amplitude variations of input electronic signals during operations can be suppressed.

BEST MODE FOR CARRYING OUT THE INVENTION

Embodiment 1

An optical signal receiving equipment according to Embodiment 1 of the invention includes a soft decision error correction function, in which the identification of optical received signals is executed by a plurality of deciders using a plurality of identification thresholds, so that it can suppress fluctuations of error correction capabilities of the optical signal receiving equipment, due to manufacturing difference in individual deciders or deterioration over time thereof, by executing hard decision-identifications with each of the plurality of deciders, and by correcting, based on each of the hard decision-identification results, thresholds in the plurality of deciders in a soft decision-identification means.

Figure 1:
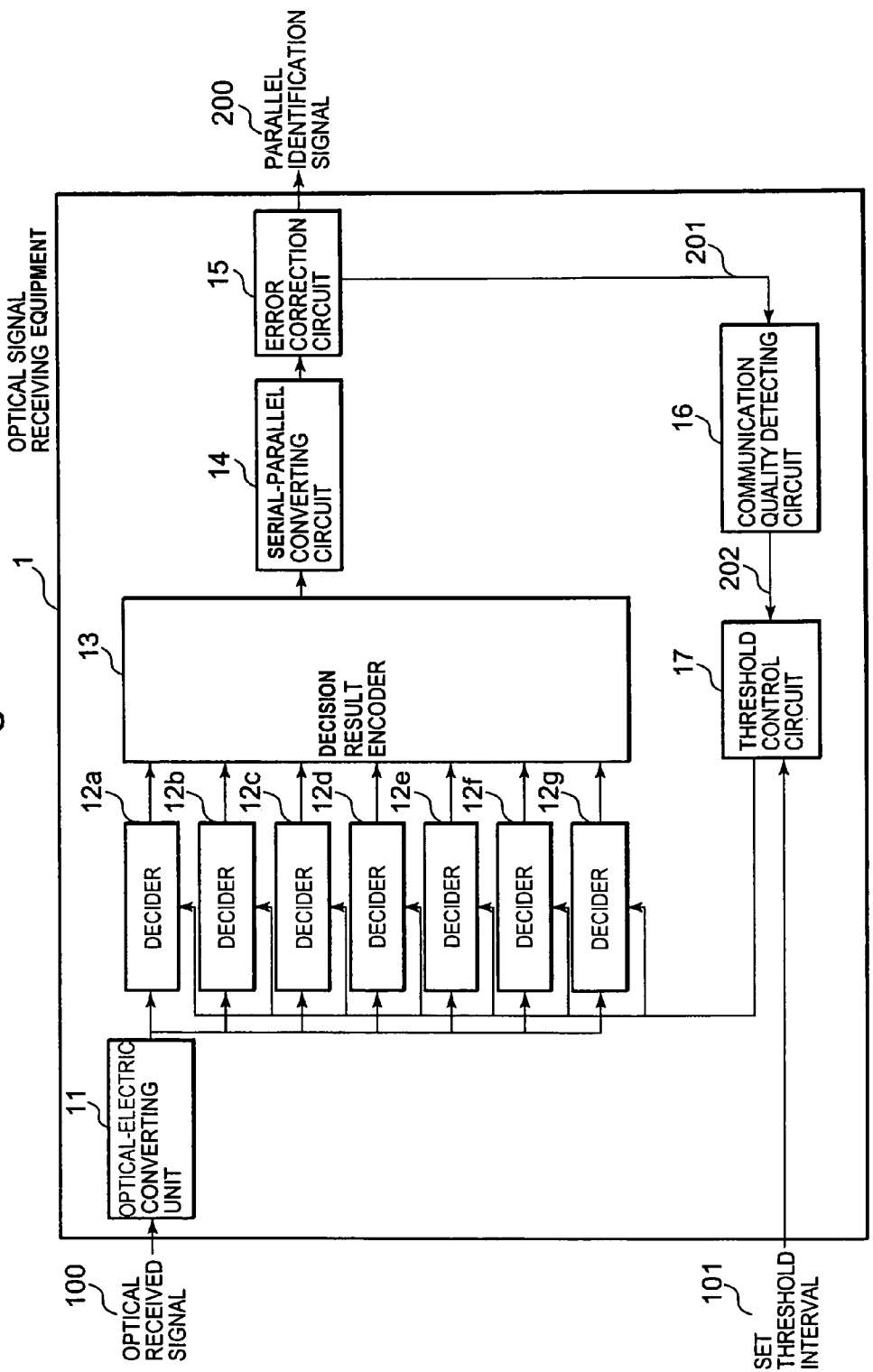
FIG. 1 is a block diagram illustrating a configuration of an optical signal receiving equipment according to Embodiment 1 of the invention.

FIG. 1 is a block diagram illustrating a configuration of an optical signal receiving equipment according to Embodiment 1 of the invention. In FIG. 1, "1" is an optical signal receiving equipment, "11" is an optical-electrical converting unit, "12a" through "12g" are deciders, "13" is a decision result encoder, "14" is a serial-parallel converting circuit, "16" is a communication quality detecting circuit, "17" is a threshold control circuit, "100" is an optical received signal, "101" is a threshold interval setting signal, "200" is a parallel identification signal, "201" is information such as identification frequencies or error correction counts of each of the deciders, and "202" is a communication quality signal. In FIG. 1, an example having seven deciders is illustrated. The optical-electrical converting unit 11 corresponds to an optical-electrical converting means. The soft decision-identification means is composed of the deciders 12a through 12g and the decision result encoder 13. An error correction circuit "15" corresponds to an error correction means. A control means is composed of the communication quality detecting circuit 16 and the threshold control circuit 17.

Next, operations of the optical signal receiving equipment will be explained. The optical received signal 100 is inputted into the optical-electrical converting unit 11, and the optical-electrical converting unit 11 converts optical signals into electric signals, and the electric signals are outputted to the deciders 12a through 12g.

The deciders 12a through 12g identify, if each of the electric signals is lower than each of the related threshold levels, as information data "0", the electric signals inputted from the optical-electrical converting unit 11 based on each of the set threshold levels, or as information data "1" if each of the electric signals is higher than each of the related threshold levels, and the identification results are outputted to the decision result encoder 13.

The decision result encoder 13 integrates into a packet identification signals as the results in which soft decision-identification has been executed, based on identification results with respect to one signal, outputted from each of the deciders 12a through 12g, and reliability information indicating a level of reliability of the identification signals, and then outputs the packet to the serial-parallel converting circuit 14. When the number of the deciders is seven as illustrated in FIG. 1, the identification signals are represented with one bit, and the reliability information indicating a level of reliability of the identification signals is represented with two bits. In addition, when the number of the deciders is, for example, three, the reliability information is represented with one bit.

The serial-parallel converting circuit 14 converts series binary-coded data inputted from the decision result encoder 13 into parallel data, so as to slow down the data rate, and outputs the data to the error correction circuit 15. The reason why the data rate is slowed down is that the processing speed of the error correction circuit 15 can be made slow. In addition, there may be a case in which the serial-parallel converting circuit 14 need not be used, depending on a relationship between the transmission rate and the processing capability of the error correction circuit 15.

The error correction circuit 15 executes error correction using the parallel data inputted from the serial-parallel converting circuit 14, and, after the error correction, outputs the parallel identification signal 200 as an identification result of the optical signal receiving equipment 1. Moreover, the error correction circuit 15 outputs, to the communication quality detecting circuit 16, the information 201 such as identification frequencies or error correction counts with respect to the information data 0 or 1 by each of the deciders.

The communication quality detecting circuit 16 detects communication quality, such as error rate or quality distribution, from the information 201 inputted from the error correction circuit 15, and outputs to the threshold control circuit 17 as the communication quality signal 202. The threshold control circuit 17 controls thresholds each to be set in the deciders 12a through 12g, based on the communication quality signal 202 inputted from the communication quality detecting circuit 16.

Figure 2:
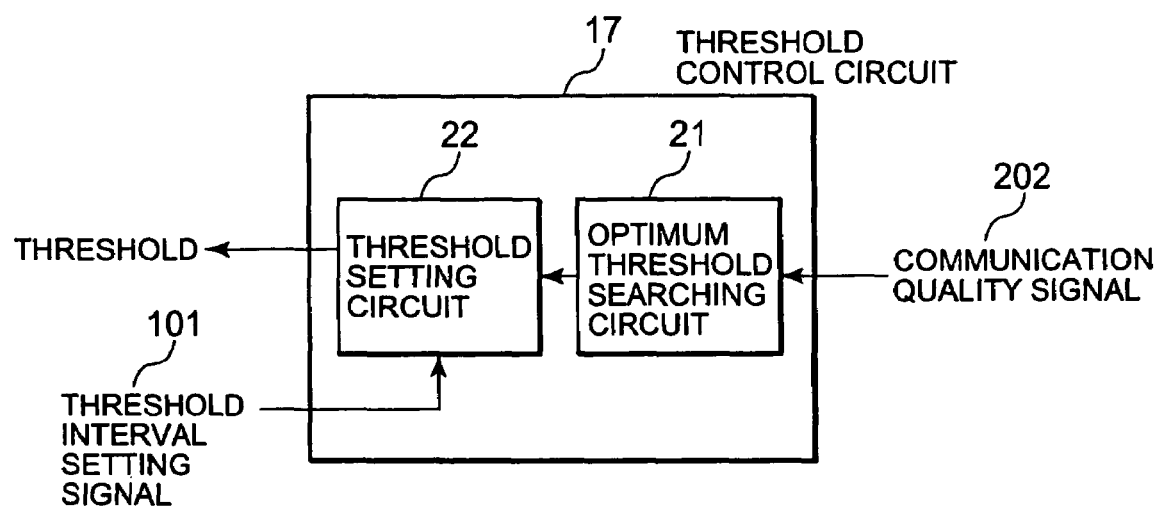
FIG. 2 is a block diagram illustrating a configuration of a threshold control circuit in the optical signal receiving equipment according to Embodiment 1 of the invention.

FIG. 2 is a block diagram illustrating a detailed configuration of the threshold control circuit 17 in FIG. 1. The communication quality signal 202 outputted from the communication quality detecting circuit 16 is inputted into an optimum threshold searching circuit "21". The optimum threshold searching circuit 21 searches for information for setting thresholds of the deciders 12a through 12g based on the communication quality signal 202, and outputs a signal to a threshold setting circuit 22. The threshold setting circuit 22 determines thresholds of the deciders 12a through 12g based on the information, inputted from the optimum searching circuit 21, for setting thresholds of the deciders 12a through 12g, and on a threshold interval setting signal 101 inputted from outside the equipment, and then outputs the thresholds.

Figure 3:
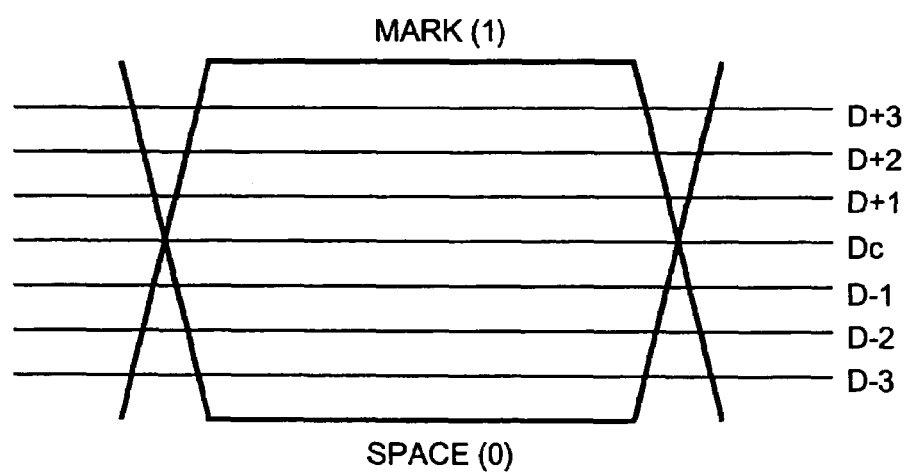
FIG. 3 is a diagram for explaining an operation of the optical signal receiving equipment according to Embodiment 1 of the invention.

Next, operations in determining thresholds of the deciders 12a through 12g will be explained in detail. FIG. 3 is an explanatory diagram illustrating each of threshold levels when each of the seven deciders identifies the received signal 100. In FIG. 3, thick full lines represent waveforms of the received signal, and "$D_c$" is the central threshold level for hard decision. "$D_{+3}$", "$D_{+2}$", and "$D_{+1}$" are threshold levels inside a mark (information data 1), and the threshold level $D_{+3}$ is located outmost. "$D_{-1}$", "$D_{-2}$", and "$D_{-3}$" are threshold levels inside a space (information data 0), and the threshold level $D_{-3}$ is located outmost. Each of the threshold levels $D_{+3}$ through $D_{-3}$ is set in each of the deciders 12a through 12g, respectively, and each of the deciders 12a through 12g outputs the identification result in accordance with whether the level of the received waveform is higher or lower than each of the thresholds.

Figure 4:
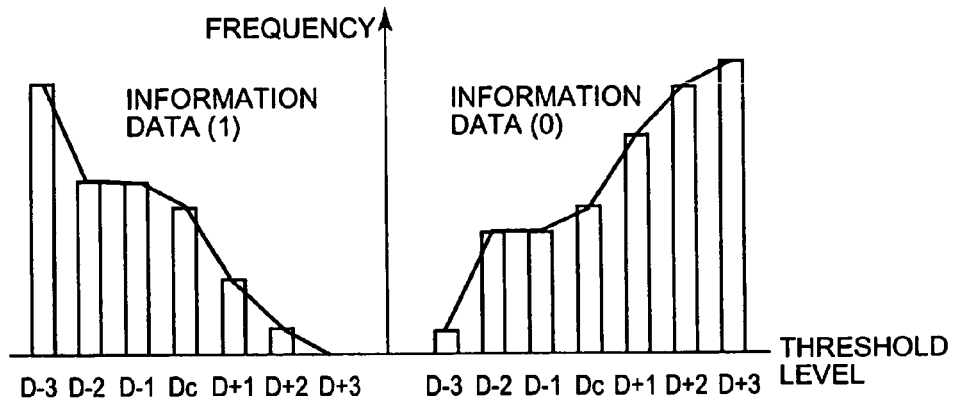
FIG. 4 is a diagram for further explaining the operation of the optical signal receiving equipment according to Embodiment 1 of the invention.

The thresholds are set with equal intervals in FIG. 3, and soft decision-identifications are executed based on the identification results related to the plurality of thresholds. However, because the deciders generally have manufacturing difference in individual deciders or deterioration over time thereof, required thresholds (in this case, equal intervals) can not always be obtained. FIG. 4 is a diagram illustrating frequencies (hereinafter, referred to as communication quality distribution) in which each of the deciders determines inputted signals as the information data 0 or 1, when a certain number of times of hard decision-identifications have been executed while thresholds in each of the deciders being fixed to the initially determined intervals. The communication quality distribution proves to be uneven, in which the identification frequencies of the information data 0 or 1 in each of the deciders are plotted with respect to the threshold levels ($D_{+3}$, $D_{+2}$, $D_{+1}$, $D_c$, $D_{-1}$, $D_{-2}$, and $D_{-3}$).

Therefore, a value that enables the frequency of determining as the information data 0 and the frequency of determining as the information data 1 to be equal in each of the deciders, is computed as a reference to even out the fluctuations due to manufacturing difference in individual deciders or deterioration over time of each of the deciders. When each of the deciders is identically configured, those thresholds are the same as each other if there is no fluctuation; however, those thresholds deviate, bit at a time, from each other if there is any fluctuation. Therefore, the fluctuation of the seven deciders can be suppressed by, having searched for those deviations in advance, correcting each threshold in accordance with the above deviations, when each of the deciders is set at each of the threshold levels ($D_{+3}$, $D_{+2}$, $D_{+1}$, $D_c$, $D_{-1}$, $D_{-2}$, and $D_{-3}$), respectively.

Figure 5:
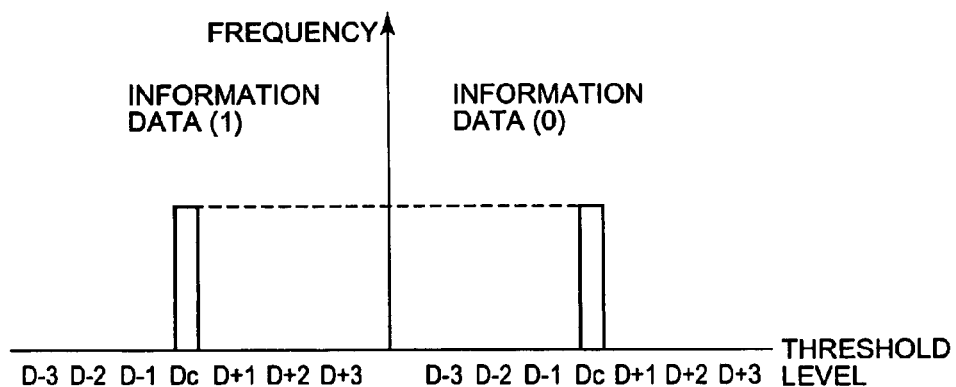
FIG. 5 is a diagram for further explaining the operation of the optical signal receiving equipment according to Embodiment 1 of the invention.

With regard to an optimum threshold searching operation in hard decision-identification, FIG. 5 is an explanatory diagram representing, as an example case, the decider 12d having the threshold level $D_c$. At first, hard decision-identification is executed a certain number of times with respect to the threshold level $D_c$, and the frequencies of hard decision-identifications, with respect to the threshold level $D_c$, as the information data 0 and the information data 1 are counted. After the frequencies having been counted, the threshold is resultantly deceased when the frequency of hard decision-identification as the information data 0 is greater than that of hard decision-identification as the information data 1; the threshold is on the contrary increased when the frequency of hard decision-identification as the information data 1 is greater than that of hard decision-identification as the information data 0, and then frequencies of hard decision-identifications as the information data 0 and the information data 1 are counted again.

The operations described above are repeated until the frequency of hard decision-identifications as the information data 0 equals the frequency of hard decision-identifications as the information data 1. When the frequency of hard decision-identifications as the information data 0 equals the frequency of hard decision-identifications as the information data 1, the hard decision-identification threshold becomes the optimum threshold. In the same way, hard decision-identification is executed to other deciders (threshold levels; $D_{+3}$, $D_{+2}$, $D_{+1}$, $D_c$, $D_{-1}$, $D_{-2}$, and $D_{-3}$), and a search for the optimum thresholds of the devices in the hard decision-identifications is conducted.

In addition, the optimum thresholds in hard decision-identifications, a search for the thresholds may be conducted by computing in such a way that the error count of the information data 0 equals that of the information data 1, instead of the frequencies of hard decision-identifications of the information data 0 and the information data 1. Moreover, a search for the optimum thresholds in hard decision-identifications may be conducted by computing in such a way that a hard decision error correction count becomes minimum.

The optimum thresholds, computed as described above, in hard decision-identifications of each of the deciders, have fluctuations on which manufacturing difference in individual deciders or deterioration over time thereof has been reflected; thereby, they each deviate slightly from original one.

Then, the initially setting intervals of the soft decision-identification thresholds are corrected, with the fluctuations from the optimum thresholds in hard decision-identifications, in order to adjust thresholds in soft decision-identifications. By controlling the soft decision-identification thresholds based on the hard identification results as described above, the fluctuations of the error correction capacity can be suppressed, which have been resulted from the manufacturing difference in individual deciders or deterioration over time thereof, in each of the optical signal receiving equipment.

Figure 6:
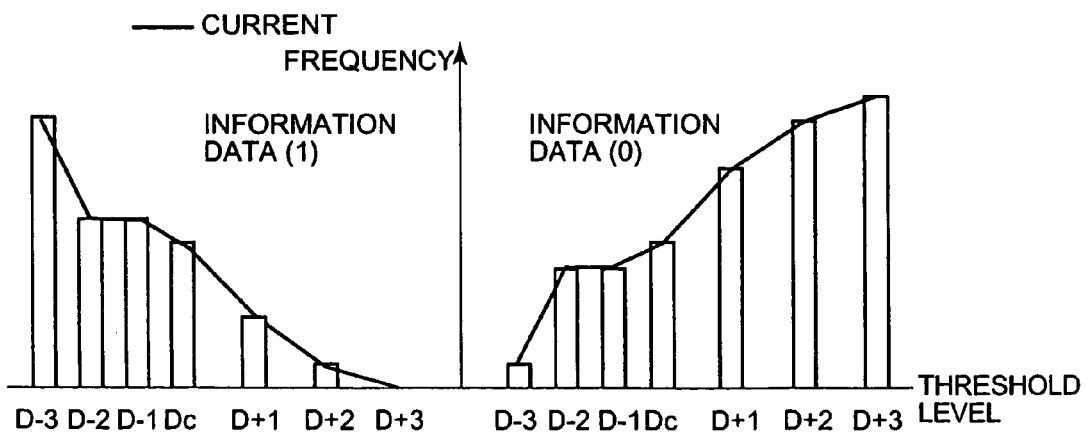
FIG. 6 is a diagram for further explaining the operation of the optical signal receiving equipment according to Embodiment 1 of the invention.

FIG. 6 is an explanatory diagram illustrating an example of communication quality after the soft decision-identification thresholds have been controlled based on the hard identification results as described above. Although the communication quality distribution becomes more even, by searching for the optimum thresholds, than the distribution before a search for the optimum thresholds is conducted, the communication quality distribution is still deviated from the optimum distribution in which an error correction capability becomes highest; therefore it is anticipated that the communication quality distribution still remains uneven.

Figure 7:
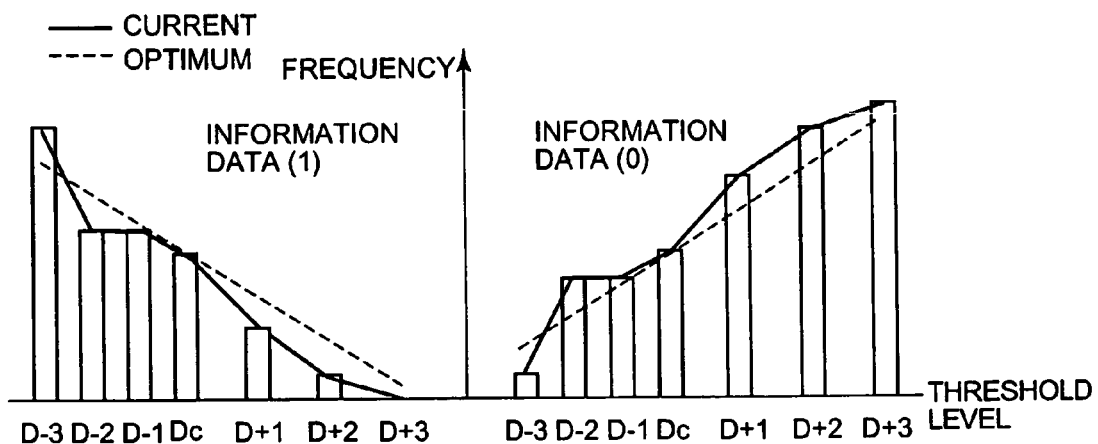
FIG. 7 is a diagram for further explaining the operation of the optical signal receiving equipment according to Embodiment 1 of the invention.

FIG. 7 is a diagram describing an optimum distribution example in which the error correction capability becomes highest, by a straight dashed line superimposed over the communication quality distribution illustrated in FIG. 6. For example, the optimum distribution can be found by obtaining a straight line ($Y=A \times X+B$) that, being fitted to plots of the communication quality distribution in which unevenness still remains, has an average gradient extrapolated from those plots, and passes the plot with respect to the central threshold level $D_c$, that has been determined as an optimum threshold. Given that the identification count of the central decider is "$N_c$", the average value of identification counts of each of the deciders (threshold levels $D_{+3}$, $D_{+2}$, and $D_{+1}$) in the mark side is "$N_+$", the average value of identification counts of each of the deciders (threshold levels $D_{-1}$, $D_{-2}$, and $D_{-3}$) in the space side is "$N_-$", the threshold level of the central decider is the $D_c$, the threshold level of the middle decider in the mark side is the $D_{+2}$, and the threshold level of the middle decider in the space side is the $D_{-2}$, the coefficient A and the constant B are calculated by the following formulas.

$$A=(N_+ - N_-)/(D_{+2} - D_{-2}) \quad \text{Formula (1)}$$

$$B=N_c - A \times D_c \quad \text{Formula (2)}$$

Figure 8:
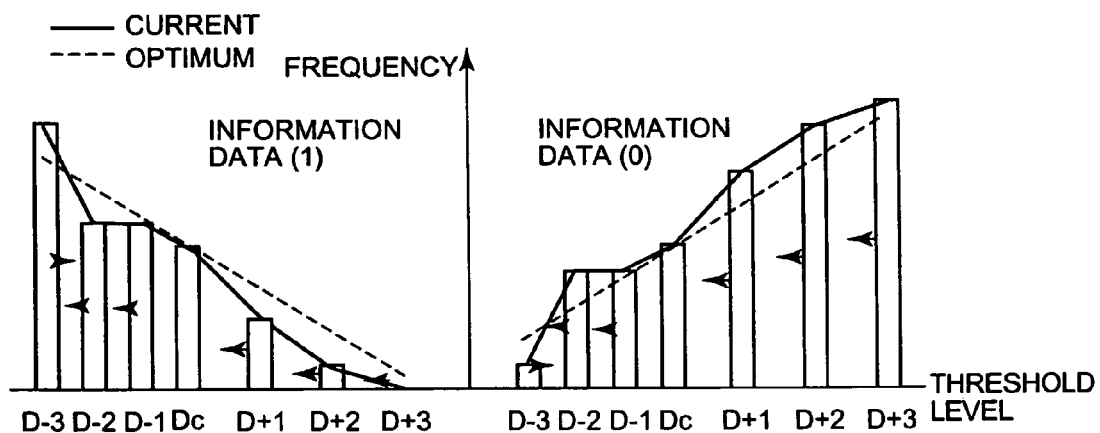
FIG. 8 is a diagram for further explaining the operation of the optical signal receiving equipment according to Embodiment 1 of the invention.

FIG. 8 is an explanatory diagram illustrating how the threshold level in each of the deciders must be shifted in order to fit the communication quality distribution to the optimum distribution calculated by the above formulas. In the area of the information data 0, the threshold levels may be decreased when the identification frequency is higher than the calculated straight line, meanwhile the threshold levels may be increased when the identification frequency is lower than the calculated straight line. In contrast, in the area of the information data 1, the threshold levels may be increased when the identification frequency is higher than the calculated straight line, and the threshold levels may be decreased when the identification frequency is lower than the calculated straight line. However, the threshold levels may be shifted in either of the areas, because the threshold levels in any one of the areas (for example, the area of the information data 0) are shifted, followed by the shift of the threshold levels in the other one.

Figure 9:
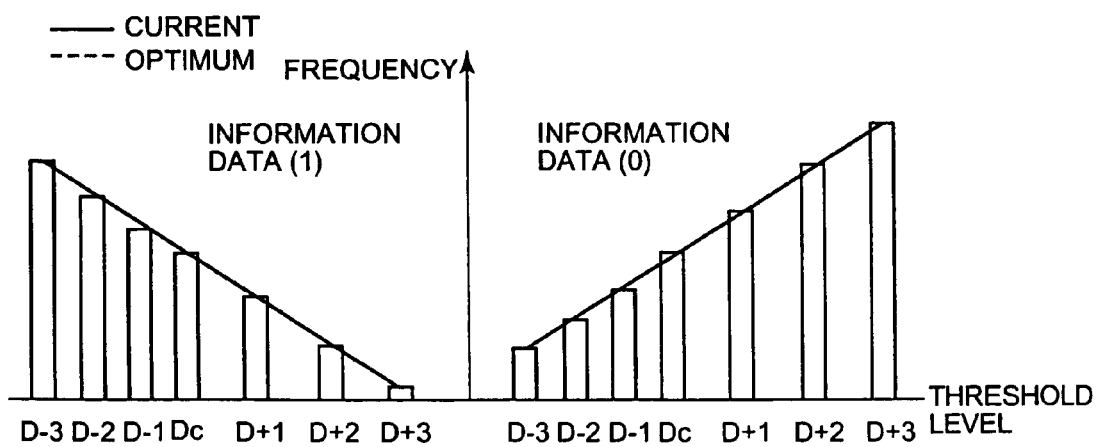
FIG. 9 is a diagram for further explaining the operation of the optical signal receiving equipment according to Embodiment 1 of the invention.

FIG. 9 is an explanatory diagram illustrating the communication quality distribution after the threshold levels in each of the deciders have been shifted as described above. The communication quality distribution can be finely made even by shifting the threshold levels in each of the deciders. The error correction capability can be optimized by controlling the threshold as described above.

In Embodiment 1 of the invention as described above, fluctuations in the error correction capabilities of the optical signal receiving equipment, due to manufacturing difference in individual deciders or deterioration over time of the decider, can be suppressed by controlling the thresholds of soft decision-identifications, in order to adjust the thresholds, in such a way that hard decision-identifications are executed in each of the deciders, a search for optimum thresholds in each of the deciders is conducted, initial interval settings in the soft decision-identification thresholds are corrected with fluctuations on which manufacturing difference in individual deciders or deterioration over time has been reflected.

The error correction capability can be optimized by controlling the thresholds of soft decision-identifications, in which the threshold levels are sifted in order to make even the communication quality distribution that is illustrated by the identification frequency identified as the information data 0 or 1 corresponding to the identification results by each of the deciders whose thresholds have been corrected.

Embodiment 2

An optical signal receiving equipment according to Embodiment 2 of the invention includes a soft decision error correction function, in which the identification of optical received signals is executed by a plurality of deciders using a plurality of identification thresholds, so that it can control electric power consumption in accordance with the quality of optical received signals by selecting an decider to be operated from the plurality of deciders in a soft decision-identification means.

Figure 10:
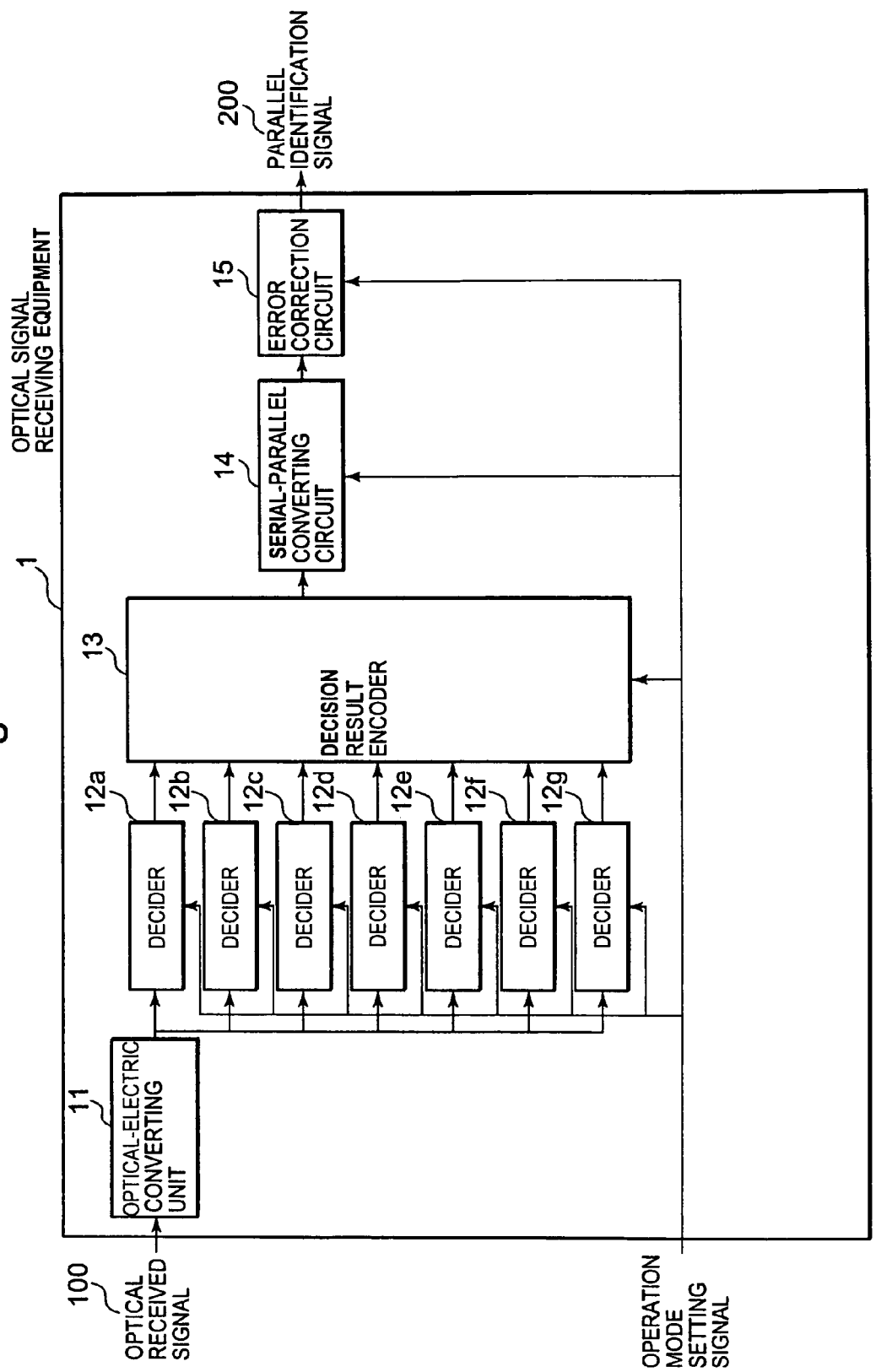
FIG. 10 is a block diagram illustrating a configuration of an optical signal receiving equipment according to Embodiment 2 of the invention.

FIG. 10 is a block diagram illustrating a configuration of an optical signal receiving equipment according to Embodiment 2 of the invention. In FIG. 10, the optical-electrical converting unit 11, the deciders 12a through 12g, the decision result encoder 13, the serial-parallel converting circuit 14, and the error correction circuit 15 are arranged in the same way as in FIG. 1. However, thresholds are not inputted into the deciders 12a through 12g, and information on, such as identification counts or error correction counts related to the information data 0 or 1 of each decider, is not outputted from the error correction circuit 15. Moreover, operational mode setting signals are inputted, from outside the equipment, into each of the deciders 12a through 12g, the decision result encoder 13, the serial-parallel converting circuit 14, and the error correction circuit 15.

The error correction capability is the lowest in the case of hard decision made by one single decider, and the more the number of the deciders, the higher the error correction capability becomes. However, increasing the number of the deciders entails the increase of the volume of circuits and electric power consumption. On the other hand, although the amount of the transmission quality degradation in a submarine cable system differs from laid down section to section, due to the difference in laid down optical fiber characteristics or intervals between repeaters, once the fibers have been laid down, the amount of the transmission quality degradation remains almost constant. Therefore, the lower is the transmission quality degradation per section, the less becomes the number of the deciders needed for demonstrating sufficient capability, as an optical signal receiving equipment.

In FIG. 10, ineffectual electric power consumption can be suppressed by operating, in accordance with operational mode setting signals, only circuits that correspond to the number of the deciders appropriate for the amount of the transmission quality degradation, in the deciders 12a through 12g, the decision result encoder 13, the serial-parallel converting circuit 14, and the error correction circuit 15.

In Embodiment 2 of the invention as described above, ineffectual electric power consumption can be suppressed, because the equipment is configured in such a way that only the circuits are operated corresponding to the deciders appropriate for the amount of the transmission quality degradation in a transmission section specified in accordance with the operational mode setting signals.

Embodiment 3

An optical signal receiving equipment according to Embodiment 3 of the invention includes a soft decision error correction function, in which the identification of optical received signals is executed by a plurality of deciders using a plurality of identification thresholds, so that it can control electric power consumption in accordance with the quality of optical received signals by selecting, based on the identification results by the plurality of deciders, one or more deciders to be operated from the plurality of deciders in a soft decision-identification means.

Figure 11:
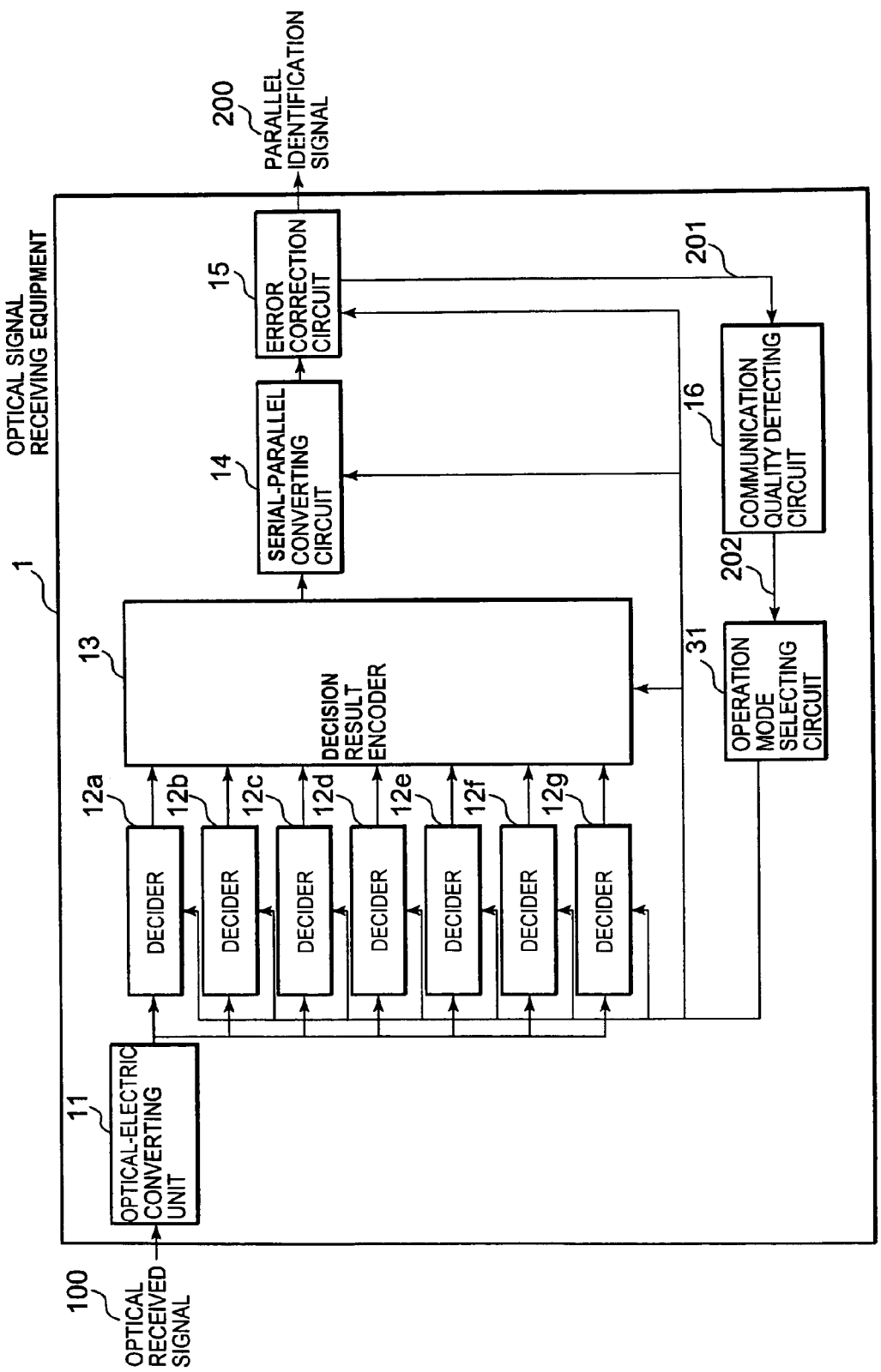
FIG. 11 is a block diagram illustrating a configuration of an optical signal receiving equipment according to Embodiment 3 of the invention.

FIG. 11 is a block diagram illustrating a configuration of an optical signal receiving equipment according to Embodiment 2 of the invention. In FIG. 11, the optical-electrical converting unit 11, the deciders 12a through 12g, the decision result encoder 13, the serial-parallel converting circuit 14, the error correction circuit 15, and the communication quality detecting circuit 16 are arranged in the same way as in FIG. 1. However, operational mode setting signals are also inputted into the optical-electrical converting unit 11, the deciders 12a through 12g, the decision result encoder 13, the serial-parallel converting circuit 14, and the error correction circuit 15. An operational mode selecting circuit "31" selects an operational mode from inputted communication quality signals inputted from the communication quality detecting circuit 16, and then outputs the operational mode setting signals to each of the deciders 12a through 12g, the decision result encoder 13, the serial-parallel converting circuit 14, and the error correction circuit 15.

In Embodiment 2 of the invention, although the operational mode setting signals are set from outside, the operational mode in this case is set taking into consideration a margin of variation such as variation over time. In Embodiment 3 of the invention, by detecting communication quality, for example, an error rate in the equipment, and thereby setting an operational mode appropriate for the transmission quality degradation, the margin is decreased; ineffectual electric power consumption can be resultantly suppressed lower than that in Embodiment 2 of the invention.

In FIG. 11, the operational mode selecting circuit 31 selects the operational mode for operating only circuits corresponding to the deciders appropriate for the amount of the transmission quality degradation in accordance with communication quality information inputted from the communication quality detecting circuit 16, and then outputs the operational mode setting signals to each of the deciders 12a through 12g, the decision result encoder 13, the serial-parallel converting circuit 14, and the error correction circuit 15.

Ineffectual electric power consumption can be suppressed by operating, in accordance with the operational mode setting signals, only circuits that correspond to the number of the deciders appropriate for the amount of the transmission quality degradation in the deciders 12a through 12g, the decision result encoder 13, the serial-parallel converting circuit 14, and the error correction circuit 15.

In Embodiment 3 of the invention as described above, ineffectual electric power consumption can be suppressed, because the equipment is configured such that the transmission quality is detected in the equipment and then only the circuits corresponding to the number of the deciders appropriate for the amount of the transmission quality degradation in a transmission section, are operated.

Embodiment 4

An optical signal receiving equipment according to Embodiment 4 of the invention, including a soft decision error correction function, in which the identification of optical received signals is executed by a plurality of deciders using a plurality of identification thresholds, further includes a hard decision-decider capable of executing hard decision-identification of the electronic signals independently from the plurality of deciders, so that it can suppress the fluctuation of error correction capabilities of the optical signal receiving equipment, due to manufacturing difference in individual deciders or deterioration over time thereof, by executing hard decision-identification with the hard decision-decider and correcting thresholds in the plurality of deciders in a soft decision-identification means based on the variation over time of the hard decision-identification results.

Figure 12:
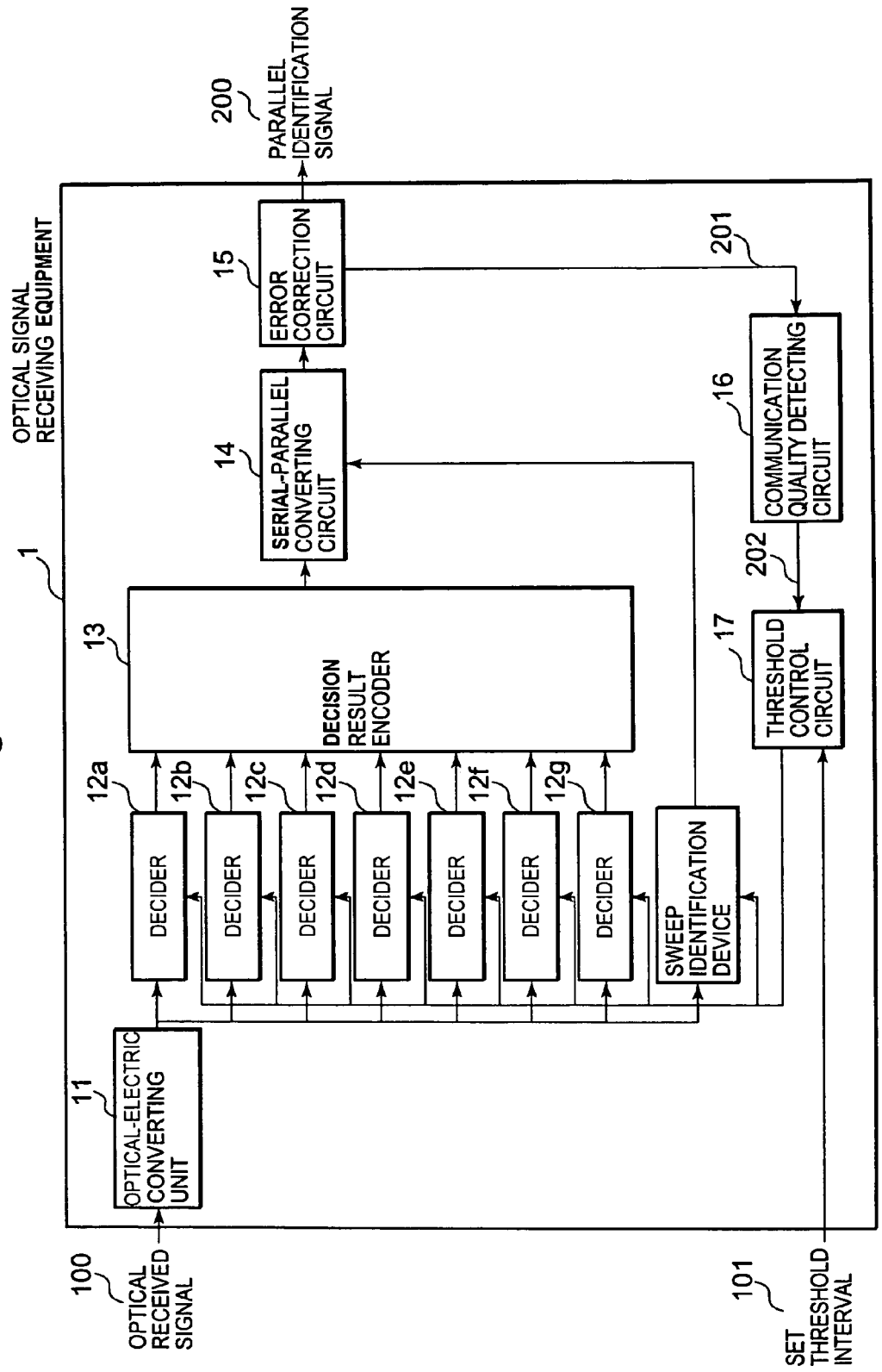
FIG. 12 is a block diagram illustrating a configuration of an optical signal receiving equipment according to Embodiment 4 of the invention.

FIG. 12 is a block diagram illustrating an optical signal receiving equipment according to Embodiment 4 of the invention. In FIG. 12, the optical-electrical converting unit 11, the deciders 12a through 12g, the decision result encoder 13, the serial-parallel converting circuit 14, the error correction circuit 15, the communication quality detecting circuit 16, and the threshold control circuit 17 are arranged in the same way as in FIG. 1. The equipment comprises, in addition to the deciders 12a through 12g for executing hard and soft decision-identifications, a sweep decider "41" enabling at all times a search for an optimum threshold by hard decision, and the sweep decider 41 outputs identification results to the serial-parallel converting circuit 14, and furthermore the error correction circuit 15 outputs, to the communication quality detecting circuit 16, information data on such as identification counts or error correction counts related to the information data 0 or 1 of each of the deciders.

At first, the soft decision-identification thresholds of the deciders 12a through 12g are controlled in the same way as in Embodiment 1 of the invention. Next, a search for an optimum threshold is conducted by the hard decision of the sweep decider 41 in the same way as in Embodiment 1 of the invention. The threshold control circuit 17 records the optimum threshold by the hard decision of the sweep decider 41. It is anticipated the optimum threshold may change if variation in the communication quality or deterioration over time of the deciders, etc. occurs. The deciders 12a through 12g can not execute a search for the optimum threshold again by the hard decision, because communication is in service after the optical signal receiving equipment 1 has started its operation. Therefore, a search for the optimum threshold of the sweep decider 41 is conducted, in which the search for the optimum threshold can be conducted by the hard decision even in service, and the soft decision-identification threshold levels of the deciders 12a through 12g are sifted by the difference between the searched optimum threshold and the optimum threshold, of the sweep decider 41, that has been recorded when the equipment is started.

In Embodiment 4 of the invention as described above, deterioration of the soft decision error correction capability, due to the variation in communication quality or variation over time of the deciders, can be suppressed, because the equipment comprises, in addition to the deciders 12a through 12g, the sweep decider 41 that can always search for an optimum threshold by hard decision, and is configured in such a way that the soft decision-identification threshold levels of the deciders 12a through 12g are sifted by the difference between the searched optimum threshold and the optimum threshold, of the sweep decider 41, that has been recorded when the equipment is started.

Embodiment 5

An optical signal receiving equipment according to Embodiment 5 of the invention includes a soft decision error correction function, in which the identification of optical received signals is executed by a plurality of deciders using a plurality of identification thresholds, so that it can suppress fluctuations of error correction capabilities due to amplitude variations of input electronic signals during operations by executing hard decision-identifications with respect to a plurality of identification levels by any one of the plurality of deciders, measuring the average amplitude of the electronic signals based on the hard decision identification results, and correcting, based on the variation over time of the measured average amplitude, thresholds in the plurality of deciders in the soft decision-identification means.

Figure 13:
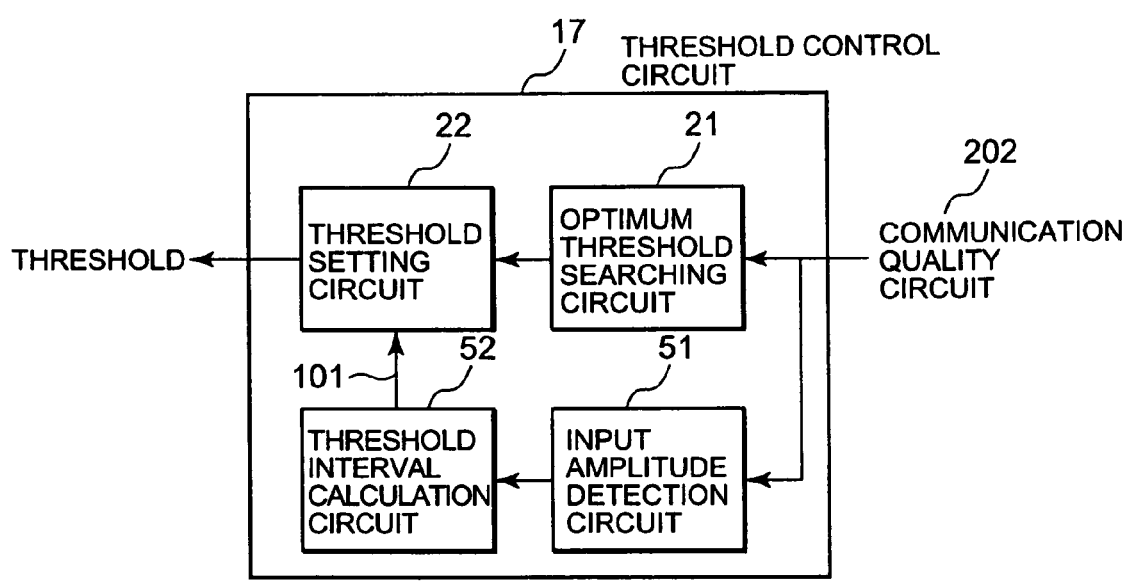
FIG. 13 is a block diagram illustrating a configuration of a threshold control circuit in an optical signal receiving equipment according to Embodiment 5 of the invention.

A block diagram according to Embodiment 5 of the invention is the same as the diagram illustrated in FIG. 12. However, FIG. 13 is a block diagram illustrating a configuration of a threshold control circuit in an optical signal receiving equipment according to Embodiment 5 of the invention, and the threshold control circuit 17 differs in detailed configuration. In other words, the communication quality signal 202 outputted from the communication quality detecting circuit 16 is inputted into an optimum threshold detection circuit "21" and an input amplitude detection circuit "51". The input amplitude detection circuit 51 searches for the amplitude of the electronic signals outputted from the optical-electrical converting unit 11 illustrated in FIG. 12, and outputs the amplitude to a threshold interval calculation circuit "52". The threshold interval calculation circuit 52 calculates threshold intervals and outputs a threshold interval setting signal 101.

Figure 14:
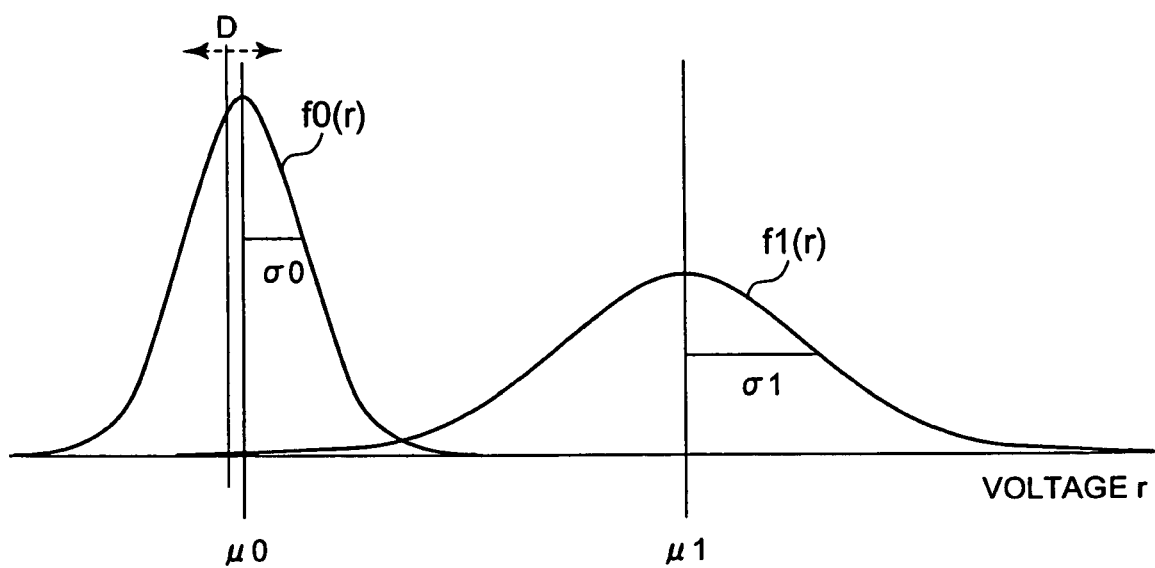
FIG. 14 is a diagram for explaining an operation of the optical signal receiving equipment according to Embodiment 5 of the invention.

Next, operations of the input amplitude detection circuit 51 will be explained in detail. In optical communication, the noise distributions of the information data 0 and 1 are generally illustrated with the Gaussian distribution, as illustrated in FIG. 14, in which dispersion "$\sigma 1$" of the information data 1 is grater than dispersion "$\sigma 0$" of the information data 0. In FIG. 14, "$\mu 0$" and "$\mu 1$" each give the average voltages of the information data 0 and 1, and the difference between the $\mu 0$ and the $\mu 1$ is the amplitude of input signals (electronic signals just after optical-electrical conversion).

Given "r" as a voltage, "f0(r)" and "f1(r)" are functions representing distributions of the information data 0 and 1 respectively, and "D" is a threshold level.

Generally, distribution values in a portion where a skirt of the curve of information data 1 overlaps that of the $\mu 0$, and a skirt of the curve of information data 0 overlaps that of the $\mu 1$, are negligible small, moreover, because the mark ratio is ½ (ratio of the information data 0 to 1 is fifty-fifty), the f1(r) is always identified as 1 when the threshold level D is equal to the μ0, and the ratio of identification as 1 to identification as 0 in the f0(r) is represented as fifty-fifty. Therefore, the ratio of identification as 0 to identification as 1 is represented 1:3, when the threshold level D is equal to the μ0. In other words, the μ0 can be obtained by searching for the threshold level at which the ratio of identification as 0 to identification as 1 becomes 1:3.

Figure 15:
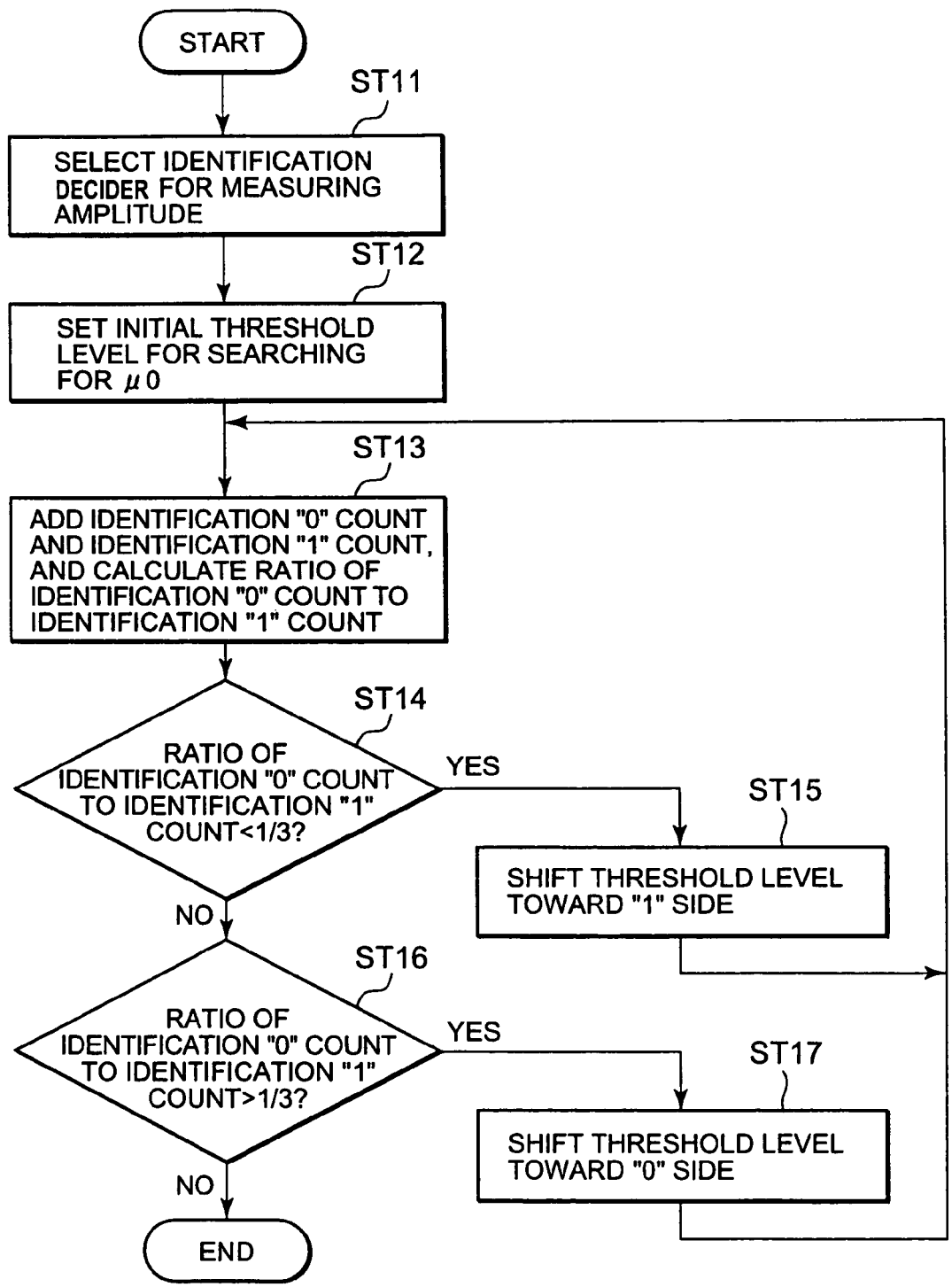
FIG. 15 is a flowchart for explaining the operation of the optical signal receiving equipment according to Embodiment 5 of the invention.

FIG. 15 is a flowchart explaining a method of searching for the μ0. At first, a decider for measuring amplitude is selected (step ST11). Because the equipment has not yet in operation when the equipment is started, any of the deciders 12a through 12g and the sweep decider 41 may be used. Because the deciders 12a through 12g are used for soft decision-identification during the operation, only the sweep decider 41 can be used for identifying the μ0. Next, the threshold level in the selected decider is set at an initial threshold level for searching for the μ0 (step ST12). Although the initial threshold level can be set at any arbitrary value, it is preferable that the level is set at a middle value between the "0" levels of the maximum and minimum input amplitudes.

Next, the counts of identification 0 and identification 1 in a predefined time are added up, and the ratio of the identification 0 to the identification 1 is calculated (step ST13). When the ratio of the identification 0 to the identification 1 is smaller than ⅓ ("Yes" flow of step ST14), the threshold levels are shifted towards "1" side (right side) (step ST15) and the step recurs to the step ST13, because the threshold levels are in the 0 side (left side) with respect to the peak of the curve f0(r) illustrated in FIG. 14. On the contrary, when the ratio of the identification 0 to the identification 1 is grater than ⅓ ("No" flow of step ST14 and "Yes" flow of step ST16), the threshold levels are shifted towards "0" side (left side) (step ST17) and the step recurs to the step ST13, because the threshold levels are in "1" side (right side) with respect to the peak of the curve f0(r) illustrated in FIG. 14. Then, these steps are repeated until the ratio of the identification 0 to the identification 1 is equal to ⅓ ("No" flow of step ST16). In addition, although input amplitude calculation may be executed irregularly, it is preferable that the calculation is executed on regular basis.

Moreover, although a search for the μ0 is conducted using the ratio of the count of the identification 0 to the count of the identification 1 in FIG. 5, the absolute value of the identification 0 count or the identification 1 count may be used. For example, if transfer rate is 10 giga bps, the μ0 is the threshold level at which the count of the identification 0 is 2.5 giga bps.

Figure 16:
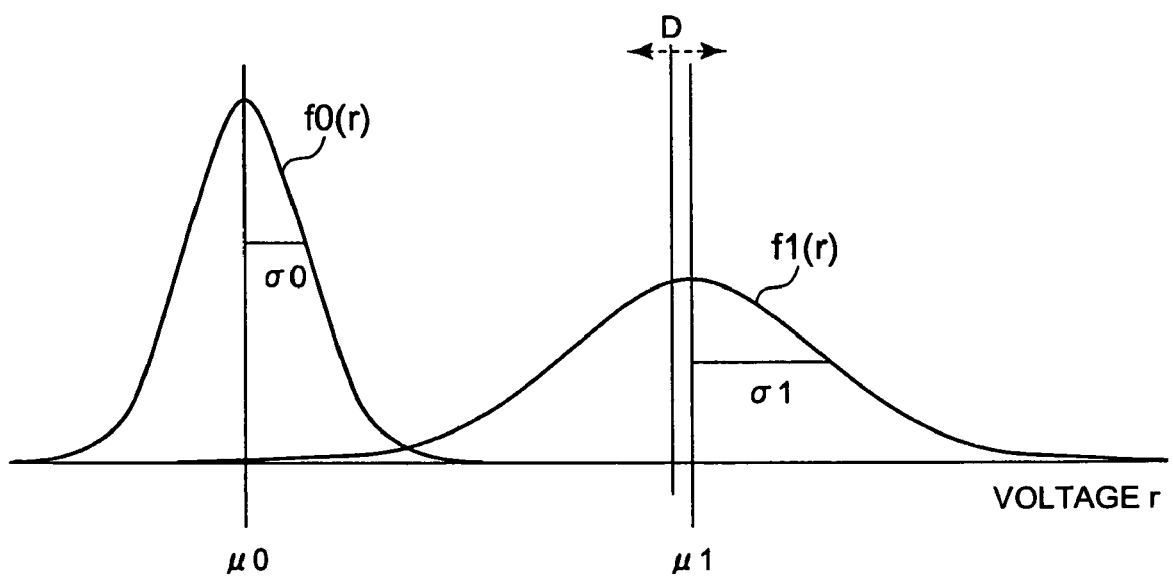
FIG. 16 is a diagram for further explaining the operation of the optical signal receiving equipment according to Embodiment 6 of the invention.

Next, procedure of calculating the μ1 will be explained in detail. As illustrated in FIG. 16, the μ1 is calculated, similarly to searching for the μ0, by searching for the threshold level D at which the ratio of identification as 0 to identification as 1 becomes 3:1.

Figure 17:
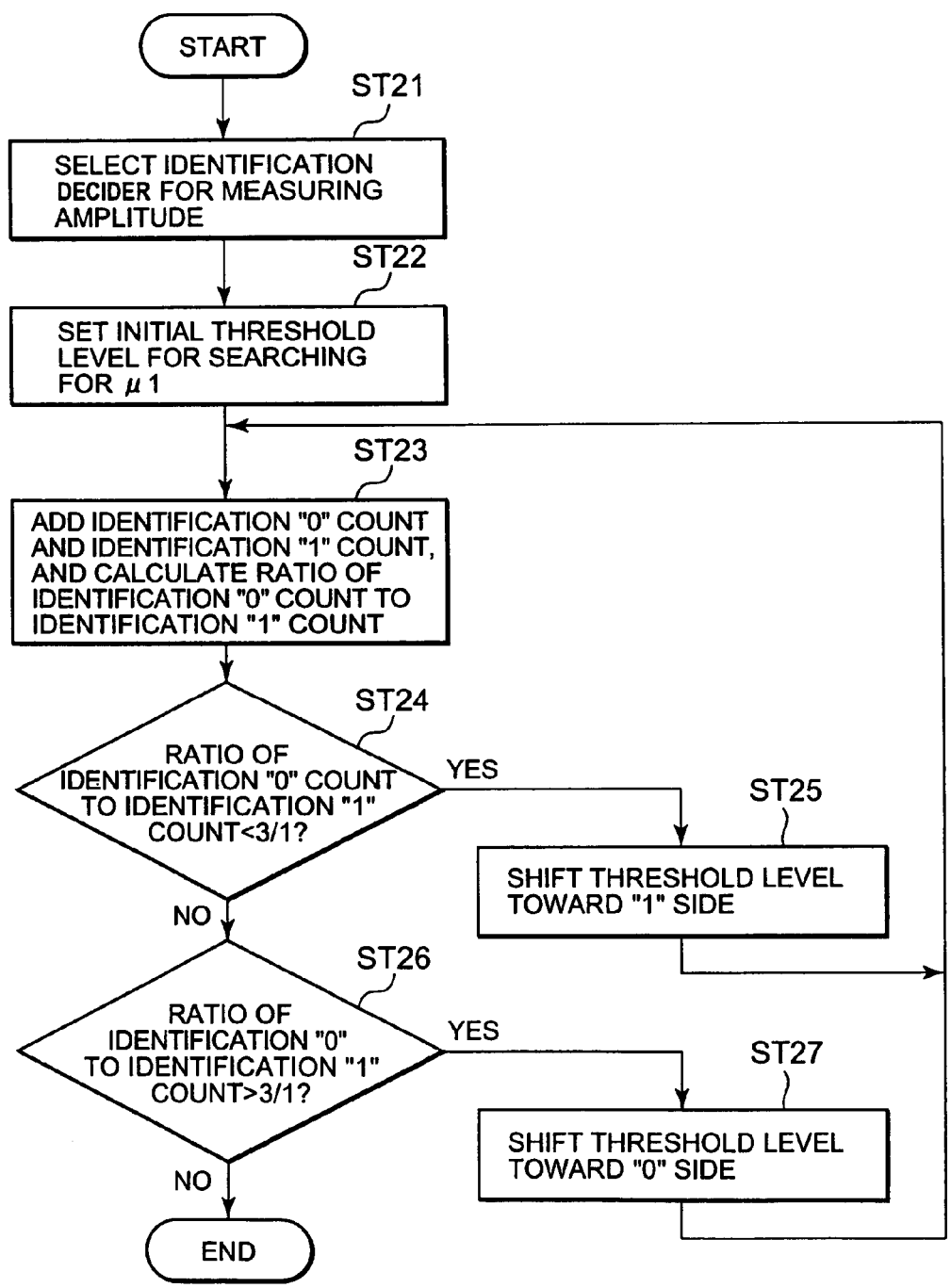
FIG. 17 is a flowchart for further explaining the operation of the optical signal receiving equipment according to Embodiment 5 of the invention.

FIG. 17 is a flowchart explaining the operation of searching for the μ1. Similarly to the case in FIG. 15, a decider for measuring the amplitude is selected (step ST21), and an initial threshold level for searching for the μ1 is set (step ST22). Next, counts of identification 0 and identification 1 for a predefined time are added up, and the ratio of the identification 0 to the identification 1 is calculated (step ST23). When the ratio of the identification 0 to the identification 1 is smaller than 3/1 ("Yes" flow of step ST24), the threshold levels are shifted towards "1" side (right side) (step ST25) and the step recurs to the step ST23, because the threshold levels are in the 0 side (left side) with respect to the peak of the curve f1(r) illustrated in FIG. 16. On the contrary, when the ratio of the identification 0 to the identification 1 is greater than 3/1 ("Yes" flow of step ST26), the threshold levels are shifted to "0" side (left side) (step ST27) and the step recurs to the step ST23, because the threshold levels are in the 1 side (right side) with respect to the peak of the curve f1(r) illustrated in FIG. 14. Then, the steps are repeated until the ratio of the identification 0 to the identification 1 is equal to 3/1 ("No" flow of step ST26).

Finally, the input amplitude is obtained by calculating the difference between the μ1 and the μ0 that have been obtained through the steps as described above.

Figure 18:
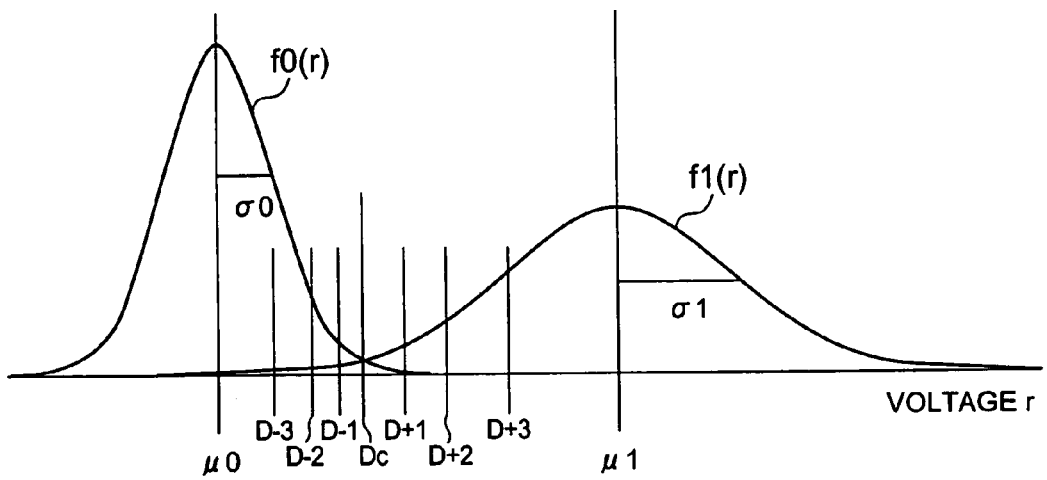
FIG. 18 is a diagram for further explaining the operation of the optical signal receiving equipment according to Embodiment 5 of the invention.

Next, operations of the input amplitude detection circuit 52 will be explained in details. FIG. 18 is a diagram explaining the arrangement of each of the thresholds. In FIG. 18, a search for the central threshold level $D_c$ for hard decision is conducted by the method described in Embodiment 1. In the same way, a search for differences in the individual deciders 12a through 12g is conducted. Next, offset voltages at the threshold levels ($D_{+3}$, $D_{+2}$, $D_{+1}$, $D_{-1}$, $D_{-2}$, and $D_{-3}$) in each of the deciders with respect to the central threshold level $D_c$ are calculated from the ratio of a predefined reference input amplitude to the input amplitude obtained by the input amplitude detection circuit 51. Then, the threshold levels in the deciders 12a through 12g are corrected based on these offset voltages. Given that the reference input amplitude is, for example, 500 mV and the offset voltages at the threshold levels of the deciders 12a through 12g are voltages of ($T_{+3}$, $T_{+2}$, $T_{+1}$, $T_{-1}$, $T_{-2}$, and $T_{-3}$), the offset voltages at the threshold levels in each of the deciders, when the input amplitude is 750 mV, are obtained as 1.5 times as high as the voltages ($T_{+3}$, $T_{+2}$, $T_{+1}$, $T_{-1}$, $T_{-2}$, and $T_{-3}$), and the offset voltages of the threshold levels in each of the deciders, when the input amplitude is 400 mV, are obtained as 0.8 times as high as the voltages ($T_{+3}$, $T_{+2}$, $T_{+1}$, $T_{-1}$, $T_{-2}$, and $T_{-3}$).

Moreover, although the threshold levels in each of the deciders may be calculated, as described above, from the ratio of the input amplitude to the predefined reference input amplitude, the threshold levels may be calculated by further multiplying the calculated threshold levels by a coefficient for fine adjustment. Moreover, a setting table for the offset voltages of the threshold levels in each of the deciders with respect to the input amplitude is prepared, so that the threshold levels may be calculated by referring to the table.

The ratio of the count of identification as 0 to the count of identification as 1 on the optimum threshold level in the soft decision-identification of the deciders 12a through 12g is uniquely determined in accordance with the shape of the Gaussian distribution in optical communication illustrated in FIG. 18. Therefore, with respect to each of the deciders, the threshold level, in the soft decision-identification, that gives the ratio of the count of identification as 0 to the count of identification as 1 by the optimum threshold level may be directly searched for, instead of searching for the μ0 and the μ1 as described above, and the threshold level may be set in each of the deciders. Moreover, although a search for the threshold level can be conducted for all the deciders, a search for the threshold level may be conducted for any of deciders, and the threshold levels of remaining deciders may be calculated to set, based on the searched result.

Moreover, the threshold levels in each of the deciders can be obtained based on the ratio of the difference between the $D_c$ and the μ0 to that between the $D_c$ and μ1 ((the difference between the $D_c$ and the μ0) vs (the difference between the $D_c$ and the μ1)) in accordance with the shape of the Gaussian distribution of optical communication illustrated in FIG. 18.

In Embodiment 5 of the invention as described above, soft decision threshold levels can be optimally corrected in accordance with amplitude variations of input electronic signals during operations, and fluctuations of error correction capabilities due to amplitude variations of input electronic signals during operations can be suppressed, because the equipment is configured such that the input amplitude detection circuit 51 searches for the amplitude of the input electronic signals, and the threshold interval calculation circuit 52 generates and outputs the threshold interval setting signal 101.

Although an example, in which a method of measuring the average amplitude of the input electronic signals based on the results of the hard decision-identification by the deciders is used for correcting the thresholds in the deciders, is described in Embodiment 5 of the invention, the application of the equipment is not limited to the example. For example, the equipment may be used for monitoring and controlling a system by monitoring input-amplitude. A method such as this of measuring the input average amplitude by the deciders enables to eliminate any additional means of measuring the input-amplitude; effects in such as simplifying the configuration of the equipment can be consequently expected.

Embodiment 6

An optical signal receiving equipment according to Embodiment 6 of the invention including a soft decision error correction function, in which the identification of optical received signals is executed by a plurality of deciders using a plurality of identification thresholds further includes a hard decision-decider capable of executing hard decision-identification of the electronic signals independently from the plurality of deciders, so that it can suppress fluctuations of soft identification error correction capabilities due to deterioration over time thereof, by comparing each of the hard decision-identification results in the plurality of deciders with the hard decision-identification result in the hard decision-decider, and by correcting thresholds in the plurality of deciders in a soft decision-identification means, based on the variation over time of the comparison results.

Figure 19:
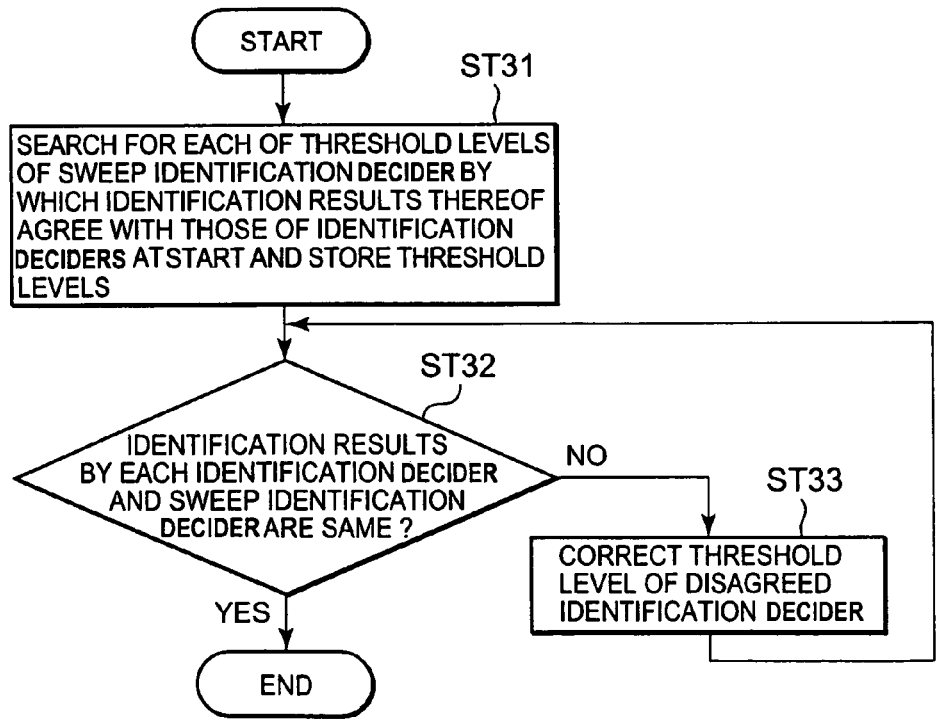
FIG. 19 is a flowchart for explaining an operation of an optical signal receiving equipment according to Embodiment 6 of the invention.

A block diagram according to Embodiment 6 of the invention is the same as the diagram illustrated in FIG. 12. Here, FIG. 19 is a flowchart for correcting, in the threshold control circuit 17 illustrated in FIG. 12, the deterioration over time of the threshold levels of the deciders 12a through 12g. At first, searches for the identification results (the counts of the identification 0 and the identification 1) using the threshold levels, set at the start of the equipment, of the deciders 12a through 12g, and the threshold level, of the sweep decider 41, that makes both the identification results the same are conducted, and the results thereof are recorded (step ST31). Next, after a predefined time, the identification results by the deciders 12a through 12g each are compared with the recorded identification results of the sweep decider 41 corresponding to each of the threshold levels; if there is a decider in which both results do not agree with each other ("No" flow of step ST32), the threshold level in the decider is corrected (step ST33), and the process recurs to the step ST32. Then, these processes are repeated until all identification results become identical ("Yes" flow of step ST32).

Although comparisons of the identification results can be executed irregularly, it is preferable that the comparisons are executed on regular basis. Moreover, a search for the hard identification threshold level $D_c$ may be conducted by using the method as described in Embodiment 1, and the thresholds of the remaining six deciders may be corrected by using the processes described above.

In Embodiment 6 of the invention as described above, the deterioration of the soft decision error correction capability, due to the variation over time of the deciders, can be suppressed, because the equipment is configured in such a way that the threshold levels in each of the deciders are corrected so as for the identification results by each of the deciders to coincide with the identification results by the sweep decider.

INDUSTRIAL APPLICABILITY

As described above, an optical signal receiving equipment according to the invention is useful for applications to a digital optical translation system such as a submarine cable system for transmitting a large-volume of data at a high speed for a long distance. However, the application of the equipment is not limited to the system. For example, the optical signal receiving equipment may be applicable to external memory devices such as a CD (compact disk) or DVD (digital versatile disk) in which optical disks are used as storage media.

What is claimed is:

1. An optical signal receiving equipment, comprising:
   an optical-electrical converting means for converting received optical signals into electronic signals;
   a plurality of variable-threshold deciders configured to transform the electronic signals into a plurality of first binary signals;
   a soft decision-identification means for computing identification signals based on results of transformation by the plurality of variable-threshold deciders, and for computing reliability information indicating a level of reliability of the identification signals;
   an error correction means for correcting an error in the identification signals by using the reliability information computed by the soft decision-identification means;
   a fixed-threshold decider configured to execute hard-decision identification of the electronic signals, independently from the soft decision-identification means and the plurality of variable-threshold deciders; and
   a control means for executing the hard decision-identification of the electronic signals by using the fixed-threshold decider, for measuring an average amplitude of the electronic signals based on the hard decision-identification results, and for correcting a plurality of thresholds in the plurality of variable-threshold deciders based on a variation of the measured average amplitude over a time period.

* * * * *